(12) United States Patent
Lambert

(10) Patent No.: US 10,274,001 B2
(45) Date of Patent: Apr. 30, 2019

(54) FASTENING

(71) Applicant: Jon Lambert, Crown Point, IN (US)

(72) Inventor: Jon Lambert, Crown Point, IN (US)

( * ) Notice: Subject to any disclaimer, the term of this patent is extended or adjusted under 35 U.S.C. 154(b) by 245 days.

(21) Appl. No.: 15/456,094

(22) Filed: Mar. 10, 2017

(65) Prior Publication Data

US 2018/0258974 A1 Sep. 13, 2018

(51) Int. Cl.
*F16B 23/00* (2006.01)
*B60B 29/00* (2006.01)
*B25B 23/00* (2006.01)

(52) U.S. Cl.
CPC ...... *F16B 23/0069* (2013.01); *B25B 23/0035* (2013.01); *B60B 29/003* (2013.01)

(58) Field of Classification Search
CPC ............. F16B 23/0069; F16B 23/0061; B25B 23/0035; B25B 23/02; B25B 23/08; B25B 23/10; B25B 23/108; B60B 29/003
See application file for complete search history.

(56) References Cited

U.S. PATENT DOCUMENTS 8,544,367 B2 * 10/2013 Buchanan ............... B25B 13/04
81/124.5

\* cited by examiner

*Primary Examiner* — David B. Thomas
(74) *Attorney, Agent, or Firm* — Daniel Zamudio

(57) ABSTRACT

A fastening assembly having torquing members that engage notches on a conical securing member. The torquing members being operable by a wrench and able to exert torque on the securing member at the notches to tighten or loosen the securing member.

13 Claims, 3 Drawing Sheets

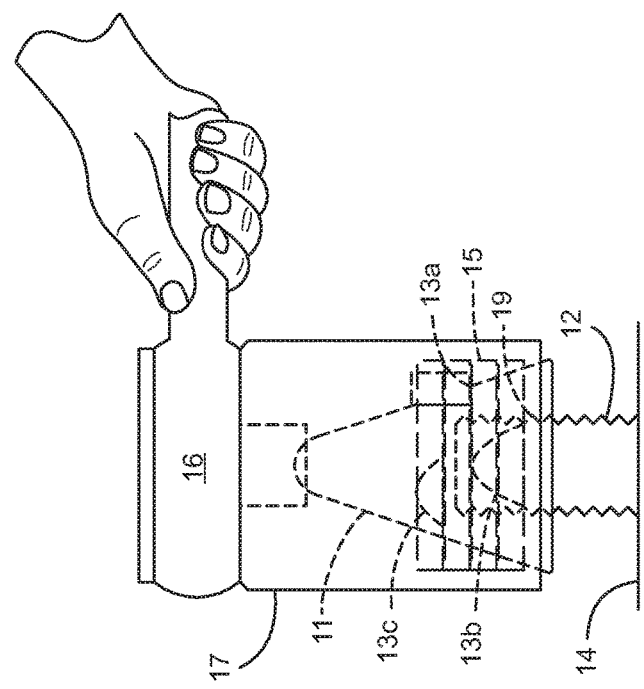
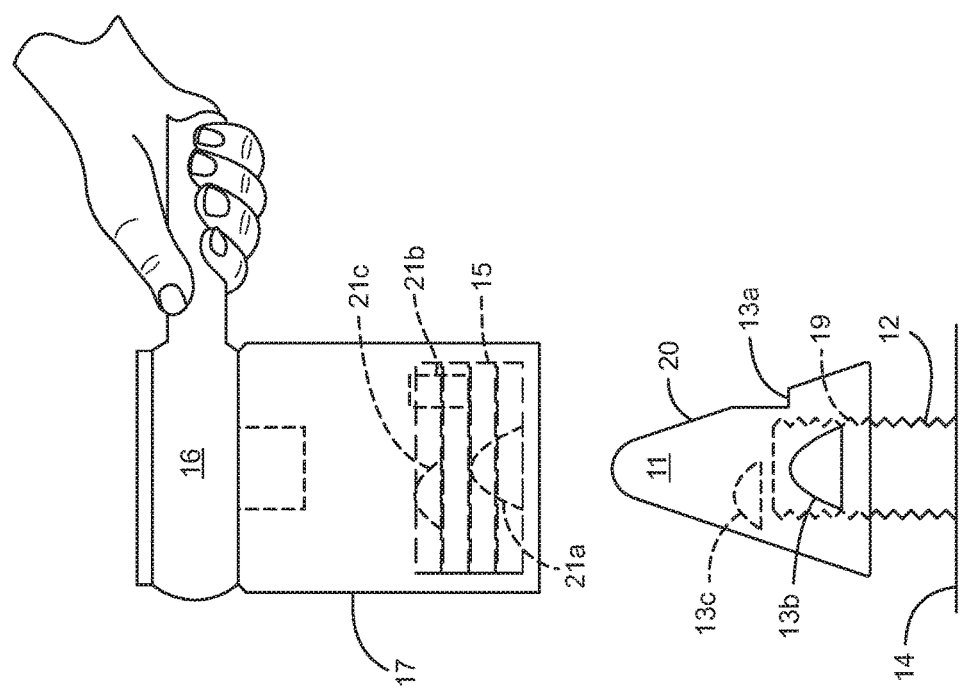
FIG. 1A
FIG. 1B

FASTENING

CROSS-REFERENCE TO RELATED APPLICATIONS

The present application claims the benefit of U.S. Provisional Patent Application No. 62/352,158, filed Jun. 20, 2016, the entirety of which is hereby incorporated by reference, including its specification.

BACKGROUND

Fasteners are used to hold objects together. In the United States fasteners are part of a twenty-three billion dollar industry. Traditionally, fasteners were intended to be attached and detached so the objects being held together could be disassembled.

The handling of fasteners is done by any one of many common tools. For instance, wrenches, pliers, screwdrivers, power tools and the like are used in various ways on nuts, a familiar type of fastener. Because of this ease with which fasteners can be removed from the objects they hold together, they provide little security. Wheels held together with lug nuts, for instance, can be stolen with a common tire iron.

Security fasteners on the market are touted as tamper-proof but are easily defeated using these common tools. Some such fasteners, those used as lug nuts on car wheels for instance, use a cylindrical body with an etched pattern on the face or body of the fastener. A person uses a special socket that fits into the etching and loosens or tightens the fastener. Similarly, many other types of security nuts can be loosened by gripping the nut with a pipe wrench, a locking wrench or even a spanner type wrench.

Using existing security nuts require torque when tightening. Damage to the fastener in high torque situations occurs. This commonly happens when tire lug nuts are tightened by auto mechanics using pneumatic tools.

There is a need in the industry for an apparatus that is easy to use, inexpensive, and provides a durable fastener that can be used for security purposes when joining objects. An apparatus suited to joining objects and providing security.

SUMMARY

The present invention is directed to an apparatus that satisfies this need. The novel fastening comprises a securing member that is generally cone or A-shaped. The securing member has a top portion, which is rounded off in a best mode, and a bottom portion. the top portion being narrower than the bottom portion. The securing member has an outer surface. It is contemplated that the outer surface is smooth and of high luster, though it can be any type of finish.

The fastening has at least one notch that is cut into its outer surface. The notches are contemplated to be made obliquely to the plane of the outer surface, however the notches can be of any shape or size that suits the purpose of the invention, slotted for instance. The fastening includes a torquing member holder and at least one torquing member. In an embodiment that has been reduced to practice the torquing members are circular, ring shaped. The at least one torquing member being removably interconnectable within the torquing member holder.

One embodiment has the ring shaped torquing members sliding into and connecting to a socket type torquing member holder. The at least one torquing member has at least one hold. The hold is contemplated to be manufactured as an integral part of the torquing member. The torquing member holder being engage-able and disengage-able with the securing member by being placed over the top portion, similar to placing a socket over a nut. The at least one hold being engage-able and disengage-able with the at least one notch as the torquing member holder is engaged and disengaged with the securing member. Noting that in the best mode the holds, being part of the torquing members, seat with the notches.

The torquing member holder is attachable and detachable to a wrench, in the mode that has been reduced to practice this operates similar to the way a socket can be attached to a ratchet wrench.

The fastening has a securing mechanism attached to the bottom portion. The mode reduced to practice has the securing mechanism being female threads which receive a bolt on a workpiece. It is understood that various types of securing mechanisms can be used, a bolt for instance. In this mode a wrench is capable of rotating the torquing member holder to operate the securing member.

The securing member and the at least one torquing member are made of heat treated alloy steel, or the like, to withstand the pressures of high torque applications, such as the use of impact wrenches to secure the fastening to a tire lug. In fact in a mode that has been reduced to practice the fastening was tested to withstand 700 ft/lbs of torque. The fastening so designed is virtually tamper proof because common tools cannot be used to remove the securing member form the workpiece it is securing. In fact, the inventor has determined that even with the fastening fully exposed, a pipe wrench could not remove it after it was fastened.

Added security is provided by the fastening because if there are a plurality notches and holds, ideally in equal numbers, each of the notches will be cut into the outer surface in different locations. This creates a virtually unlimited number of combinations of different locations where each of the plurality of the at least one notches are cut. This allows unique combinations to be made for any one fastening creating a customized and unique notch configuration.

Another embodiment of the invention comprises a novel fastening for connecting to a male thread, though other embodiments connect to a female thread, the fastening has a cone-shaped securing member with a large diameter base and a small diameter top, the securing member includes female threads that penetrate the base along a centerline towards the top. There is at least one notch formed in a securing member outer surface and a torquing member removably disposed to encircle the securing member, the torquing member has an inward-directed hold that engages the at least one notch to contact the securing member outer surface. There is a torquing member holder that encircles the torquing member wherein the torquing member holder, engaged with the torquing member, causes the torquing member to rotate with the torquing member, and wherein the torquing member, engaged with the securing member via engagement of the inward-directed hold and contacting the at least one notch, causes the securing member to rotate about the male thread to tighten or loosen the securing member.

This embodiment can have the at least one notch positioned at a first height from the base penetrating the outer surface at a first diameter about the centerline with the torquing member contacting the securing member outer surface at the first height.

The embodiment can be such that the torquing member further includes an outward-directed rotation stop and the torquing member holder further includes an inward-directed engagement feature configured to contact the rotation stop. In this way the torquing member holder causes the torquing member to rotate via engagement of the rotation stop with the engagement feature.

Yet another embodiment of the invention comprises a cone-shaped securing member with a large diameter base and a small diameter top, the securing member including female threads penetrating the base along a centerline towards the top. There is a first notch formed in a securing member outer surface. That first notch is positioned at a first height from the base and penetrating the outer surface to a first diameter from the centerline. There is a second notch formed in a securing member outer surface. That second notch positioned at a second height from the base and penetrating the outer surface to a second diameter from the centerline.

The embodiment has a first torquing member disposed to removably encircle the securing member, the first torquing member including an inward-directed hold configured to engage the first notch and to contact the ring member outer surface at the first height, the first torquing member including an outward-directed rotation stop. There is a second torquing member disposed to removably encircle the securing member, the torquing member including an inward-directed hold configured to engage the second notch and to contact the securing member outer surface at the second height, the second torquing member including an outward-directed rotation stop. There is a torquing member holder configured to encircle the first and second torquing members wherein the torquing member holder, engaged with the first and second torquing members via the engagement features, causes the first and second torquing members to rotate with the torquing member holder, and wherein the first and second torquing members, engaged with the securing member via engagement of the first inward-directed hold contacting the first notch and the second inward-directed hold contacting the second notch, causes the securing member to rotate about the male thread to tighten or loosen the securing member.

The invention is easy to use, similar to using a socket wrench, making it easy for people to use to secure possessions such as the wheels of a car.

BRIEF DESCRIPTION OF THE SEVERAL VIEWS OF THE DRAWINGS

These and other features, aspects and advantages of the present invention will become better understood with regard to the following description, appended claims, and accompanying drawings where:

FIG. 1B and FIG. 1B show a perspective view of an embodiment of the fastening.

DESCRIPTION

Figure 2A:
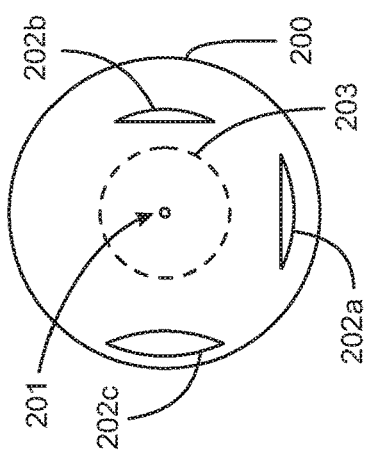
FIG. 2A and FIG. 2B show a perspective view of another embodiment of the fastening showing a torquing member engaged.

Overview.

As shown in FIG. 1, an embodiment of the fastening comprises a securing member 11. The securing member 11 is attached to a bolt 12 of a workpiece 14 via thread 19. The securing member 11 has cut into its outer surface 20 a plurality of notches 13a thru 13c. The securing member 11 is cone shaped and has a rounded top. A plurality of torquing members 15 are shown fixedly attached within a torquing member holder 17 which is similar to a socket. A wrench 16 is attached to the torquing member holder 17. FIG. 1B shows 16 in an alternate position. A plurality of holds 21a thru 21c are integrally attached to the torquing members 15. When the torquing member holder 17 is placed over the securing member 11, shown in FIG. 1B, the holds 21 fit into the notches 13. In that position, turning the wrench 16 exerts various pressures against the notches 13 operating the securing member 11 to tighten or loosen the securing member 11 from the bolt 12 of the workpiece 14.

Figure 2B:
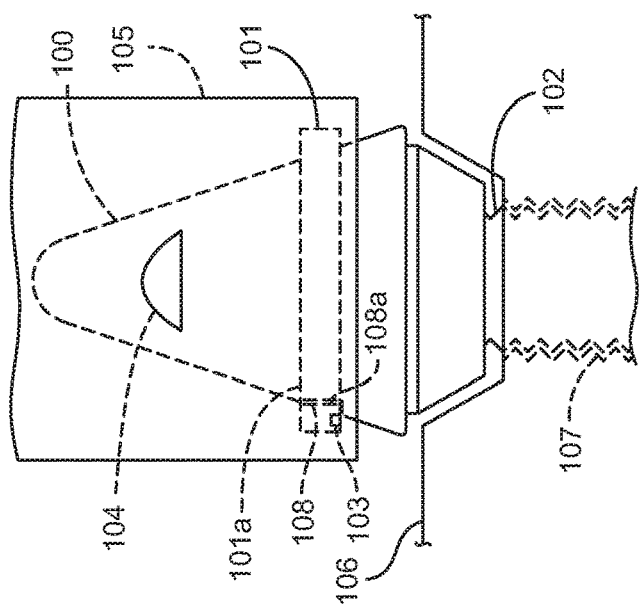

As shown in FIG. 2, another embodiment of the fastening comprises a securing member 100. The securing member 100 is attached to a threaded opening 107 of a workpiece 106 via bolt 102. The securing member 100 has cut into its outer surface a plurality of notches 103 and 104 that are differently shaped and sized. The securing member 100 is cone shaped. A torquing member 101 is shown removably attached to the securing member 100 and in an alternate position the torquing member 101a is shown located within a torquing member holder 105 into which the torquing member 101 slides. FIG. 2B shows 105 in an alternate position. The torquing member 101 has a hold 108 and 108a. The hold 108 seats into the notch 103.

Figure 3:
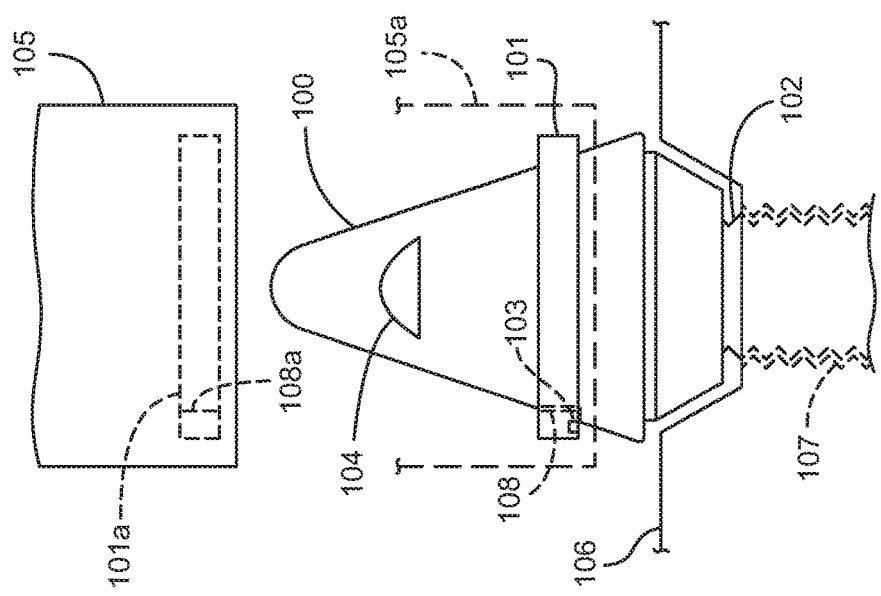
FIG. 3 shows a top view of the securing member or the fastening.

As shown in FIG. 3, a securing member of the fastening comprises the securing member 200. The securing member 200 has a plurality of notches 202a thru 202c. The securing member 200 is cone shaped and has a rounded top 201. The securing member is removably attached to the bolt of a workpiece 203.

Figure 4:
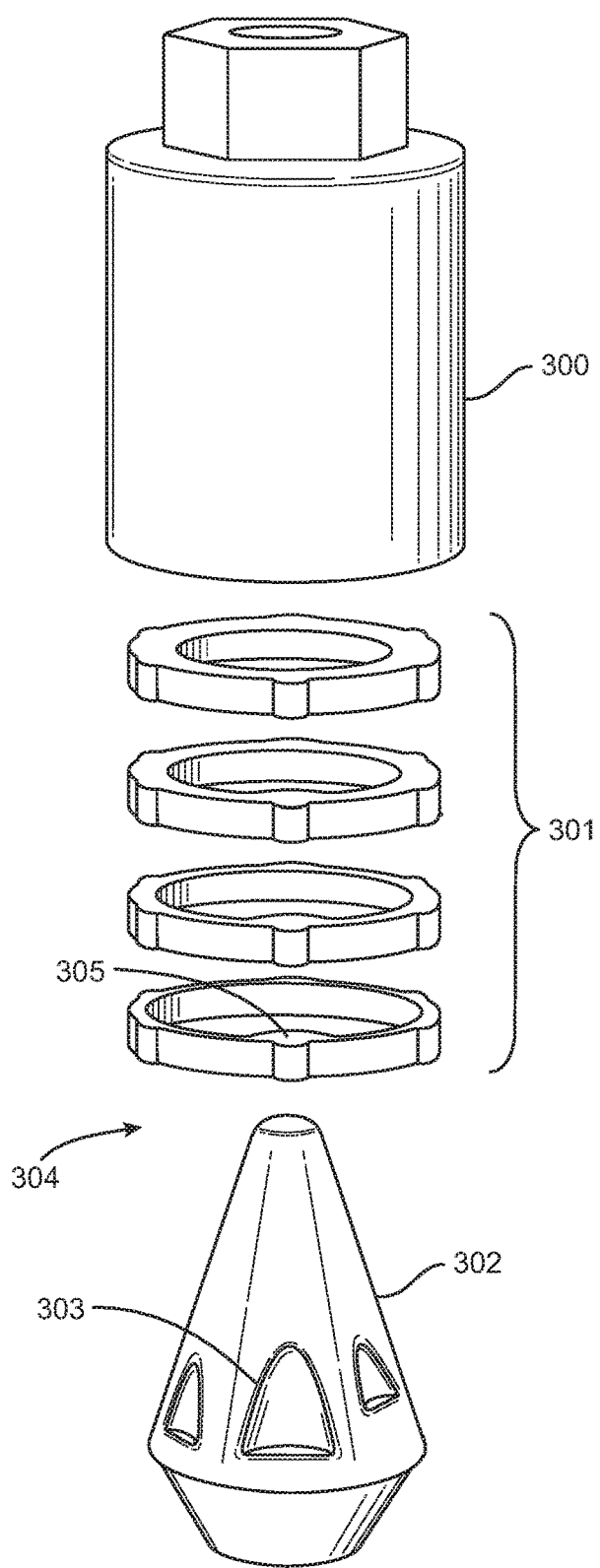
FIG. 4 shows an exploded view of another embodiment of the fastening.

As shown in FIG. 4, another embodiment of the fastening comprises a securing member 302. The securing member 302 has a plurality of notches 303. A plurality of torquing members 301 are shown having at least one hold 305. The holds are manufactured to seat within the notches 303. The securing member 302 is cone shaped and has a rounded top 304. A securing member holder 300 is shown. When the torquing member holder 300 is lowered the plurality of torquing members 301 and the securing member 302 fit into the torquing member holder 300 and the holds 305 seat with the notches 303.

Although the present invention has been described in considerable detail with the reference to certain preferred versions thereof, other versions are possible. For example, the holds may be formed integrally with the torquing member holder as opposed to having torquing members that are separately insertable into the torquing member holder. Or, the securing member may have other bottoms besides a bolt or nut as disclosed. Therefore, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. § 112, ¶6.

What I claim is:

1. A novel fastening comprising:
a securing member;
the securing member being generally cone shaped;
the securing member having a top portion and a bottom portion;
the top portion being narrower than the bottom portion;
the securing member having an outer surface;
at least one notch;

the at least one notch being cut into the outer surface;
a torquing member holder;
at least one torquing member;
the at least one torquing member being removably interconnectable within the torquing member holder;
the at least one torquing member having at least one hold;
the torquing member holder being engage-able and disengage-able with the securing member by being placed over the top portion;
the at least one hold being engage-able and disengageable with the at least one notch as the torquing member holder is engaged and disengaged with the securing member;
the torquing member holder being attachable and detachable to a wrench.

2. The fastening of claim 1 further comprising:
a securing mechanism;
the securing mechanism being attached to the bottom portion.

3. The fastening of claim 1 wherein the wrench is capable of rotating the torquing member holder to operate the securing member.

4. The fastening of claim 1 wherein the securing member and the at least one torquing member are made of heat treated alloy steel.

5. The fastening of claim 1 wherein the torquing member is a socket.

6. The fastening of claim 1 that is tamper proof.

7. The fastening of claim 1 wherein the fastening is simple to use for fastening.

8. The fastening of claim 1 further comprising:
a plurality of the at least one notches and an equal number of holds;
each of the plurality of the at least one notches being cut into the outer surface in different locations;
there being a virtually unlimited number of combinations of different locations where each of the plurality of the at least one notches are cut.

9. A novel fastening comprising:
a securing member;
the securing member being generally cone shaped;
the securing member having a top portion and a bottom portion;
the top portion being narrower than the bottom portion;
the securing member having an outer surface;
at least one notch;
the at least one notch being cut into the outer surface;
a torquing member holder;
at least one torquing member;
the at least one torquing member being removably interconnectable within the torquing member holder;
the at least one torquing member having at least one hold;
the torquing member holder being engage-able and disengage-able with the securing member by being placed over the top portion;
the at least one hold being engage-able and disengageable with the at least one notch as the torquing member holder is engaged and disengaged with the securing member;
the torquing member holder being attachable and detachable to a wrench;
a securing mechanism;
the securing mechanism being attached to the bottom portion;
the wrench being capable of rotating the torquing member holder to operate the securing member;
the securing member and the at least one torquing member being made of heat treated alloy steel;
the torquing member being tubelike;
the fastening being tamper proof;
the securing member and the at least one torquing member are made of heat treated alloy steel;
a plurality of the at least one notches and an equal number of holds;
each of the plurality of the at least one notches being cut into the outer surface in different locations;
there being a virtually unlimited number of combinations of different locations where each of the plurality of the at least one notches are cut.

10. A novel fastening for connecting to a male thread, the fastening comprising:
a cone-shaped securing member with a large diameter base and a small diameter top, the securing member including female threads penetrating the base along a centerline towards the top;
at least one notch formed in a securing member outer surface;
a torquing member removably disposed to encircle the securing member, the torquing member including an inward-directed hold configured to engage the at least one notch and to contact the securing member outer surface;
a torquing member holder configured to encircle the torquing member; and
wherein the torquing member holder, engaged with the torquing member, causes the torquing member to rotate with the torquing member, and wherein the torquing member, engaged with the securing member via engagement of the inward-directed hold contacting the at least one notch, causes the securing member to rotate about the male thread to tighten or loosen the securing member.

11. The novel fastening of claim 10, wherein the at least one notch is positioned at a first height from the base and penetrates the outer surface at a first diameter about the centerline, and wherein the torquing member contacts the securing member outer surface at the first height.

12. The novel fastening of claim 10, wherein the torquing member further includes an outward-directed rotation stop and the torquing member holder further includes an inward-directed engagement feature configured to contact the rotation stop, and wherein the torquing member holder causes the torquing member to rotate via engagement of the rotation stop with the engagement feature.

13. A novel fastening for connecting to a male thread, the fastening comprising:
a cone-shaped securing member with a large diameter base and a small diameter top, the securing member including female threads penetrating the base along a centerline towards the top;
a first notch formed in a securing member outer surface, the first notch positioned at a first height from the base and penetrating the outer surface to a first diameter from the centerline;
a second notch formed in a securing member outer surface, the second notch positioned at a second height from the base and penetrating the outer surface to a second diameter from the centerline;
a first torquing member disposed to removably encircle the securing member, the first torquing member including an inward-directed hold configured to engage the first notch and to contact the ring member outer surface at the first height, the first torquing member including an outward-directed rotation stop;

a second torquing member disposed to removably encircle the securing member, the torquing member including an inward-directed hold configured to engage the second notch and to contact the securing member outer surface at the second height, the second torquing member including an outward-directed rotation stop;

a torquing member holder configured to encircle the first and second torquing members;

wherein the torquing member holder, engaged with the first and second torquing members via the engagement features, causes the first and second torquing members to rotate with the torquing member holder, and wherein the first and second torquing members, engaged with the securing member via engagement of the first inward-directed hold contacting the first notch and the second inward-directed hold contacting the second notch, causes the securing member to rotate about the male thread to tighten or loosen the securing member.

* * * * *